Jan. 6, 1970　　　L. L. WEISGLASS　　　3,488,117

HIGH SPEED COLOR ENLARGER WITH INTEGRATING SPHERES

Filed May 8, 1967

INVENTOR
LOUIS L. WEISGLASS

BY ATTORNEY

United States Patent Office 3,488,117
Patented Jan. 6, 1970

3,488,117
HIGH SPEED COLOR ENLARGER WITH INTEGRATING SPHERES
Louis L. Weisglass, New York, N.Y., assignor to Berkey Photo Inc., Woodside, N.Y., a corporation of Delaware
Filed May 8, 1967, Ser. No. 636,952
Int. Cl. G03b 27/54, 27/76
U.S. Cl. 355—37                               6 Claims

ABSTRACT OF THE DISCLOSURE

A high speed enlarger for the making of colored photographic prints of various sizes and utilizing an integrating sphere of preselected diameter relative to negative size for uniformly illuminating the latter. Conical light guides extend radially in a common plane from each side of the integrating sphere and connect to a light collector. These conical light guides have a predetermined entrance and exit diameter as well as overall length which bears a definite relationship to the sphere diameter, to restrict light losses to a minimum with attendant increase in speed of print production.

BACKGROUND OF THE INVENTION

Figure 1:
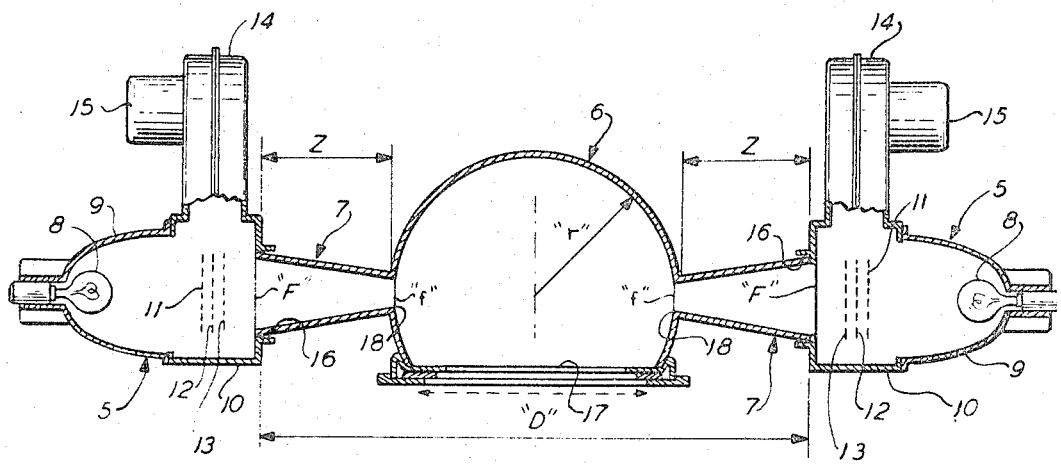

It is now known in the art to employ an integrating sphere provided with a diffusely reflecting interior surface and having an exit window through which the light uniformly emerges over the surface of the adjacent negative to be printed. The light is generated by a lamp enclosed within oppositely disposed light collectors each having a surface of revolution of elliptical cross-section and a specularly reflecting surface, while the focal point of these light collectors coincides with the entrance window of the spherical integrating body, such as shown in U.S. Patent No. 3,028,483, issued Apr. 3, 1962 to Alfred Simmon, and assigned to a predecessor company of the present assignee.

Subsequently it was determined that these spherical integrating bodies for mixing and integrating the light emerging through the exit window thereof could be interchanged in diameter so as to produce values of light energy per unit area in accordance with the size of the transparencies to be printed or enlarged and thus simultaneously shortening the exposure time from that previously required for the same size negative. Such an apparatus is disclosed and claimed in the pending U.S. application, Ser. No. 447,326, filed Apr. 12, 1965, in the name of Alfred Simmon and assigned to a predecessor company of the present assignee.

The difficulty with the apparatus as therein shown and described was its high manufacturing costs because of the necessity for mechanism operable to reciprocally move the light collector and filter units on each side of the spherical integrating bodies to accommodate the various sphere diameters. Moreover, the exchanging of various diameter spheres as required for each particular size transparency and adjustment of the enlarger apparatus thereto was too complicated and time consuming for efficient and reasonably rapid operation.

It has now been established that provision of conical-shaped light guides of specific dimensions and forming an integral part of each spherical integrating body for interconnecting the latter with its respective elliptical light collector will also further increase the light passing into the spherical integrating body and hence out of the exit window over the unit area of the adjacent transparency. Also the interchange of various size spherical integrating bodies with their integral conical light guides into the enlarger between the light collector and filter units requires no complicated and costly mechanism and such interchange is very rapidly consumated by the operator with ease.

SUMMARY OF THE PRESENT INVENTION

It is accordingly the primary object of the present invention to provide a high speed color enlarger for the making of photographic prints and enlargements wherein various size spherical integrating bodies are employed depending upon the size of the transparency to be printed and which bodies are provided with conical light guides for directing the light-beam interiorly thereof.

Another object of the present invention is the provision of a high speed color enlarger for rapidly making photographic prints and enlargements in which spherical integrating bodies of various diameters are utilized, depending upon the size of the film transparency to be printed or enlarged, and wherein each size spherical integrating body is provided with integral conical-shaped light guides having specific dimensions of over-all length together with inlet and outlet end diameters in relation to the diameter of the spherical body of which they are a part.

The foregoing objects together with others which will become apparent to those skilled in the art as the following description proceeds are achieved in accordance with the present invention by the provision of a high speed color enlarger for the making of color prints or enlargements from various size transparencies, wherein a spherical integating body provided with a diffusely reflecting interior surface and having a diameter related to the size of the transparency to be printed, is utilized. Such spherical body is also provided with integral radially extending conical-shaped light guides, which have a length and angulation from one end to the other in direct relation to the diameter of the spherical body, so that the unit of sphere and conical light guides has a fixed over-all length regardless of sphere diameter. Moreover, these units of uniform length and varying sphere diameter are easily and quickly disposed between the light collector and filter units so as to match the proper size sphere with that of the dimensions of each film transparency to be printed or enlarged.

Figure 2:
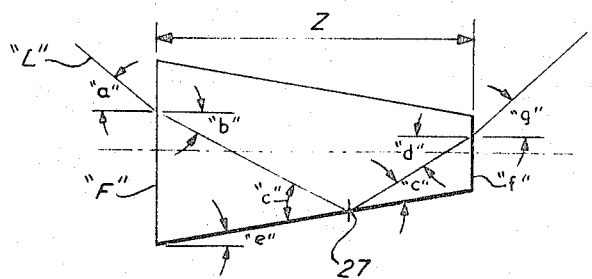

The present invention may be more fully appreciated by reference to the accompanying drawing wherein:

FIGURE 1 is a wide view partly in cross-section and partly schematic and showing the high speed color enlarger with interchangeable integrating spherical bodies in accordance with the present invention, and FIG. 2 is a schematic illustration of one of the conical light guides forming an integral part of the integrating spherical body of the present invention.

Referring now to the drawings in detail it will be noted that the high speed color enlarger as shown in FIG. 1 is basically formed of three units, namely, two oppositely disposed combination light collector and filter units 5 and a single unit formed of the integrating spherical body 6 together with its integral radially extending conical light guides 7. Each of the units 5 is composed of a light source, such as an incandescent lamp 8, an elliptical highly efficient light collector 9 provided with a specular reflecting surface and which projects a beam of light through the filter chamber 10.

In passing through the filter chamber 10 the light beam is intercepted by color filters composed of a yellow filter 11, a cyan filter 12 and a magneta filter 13 with each filter being graduated by increasing steps of density of its respective color. This results in the production of maximum intensity of all colors which are known within the graph of a chromaticity triangle, as determined by the maximum color density of the respective filters 11, 12 and 13, as is well known in the art. For the purpose of cooling the filters 11, 12 and 13 each filter unit 5 is provided with a centrifugal cooling blower 14, which is rotated by an electric motor 15, as seen in FIG. 1. The colored light beam thus produced then emerges from the filter unit 5 through an exit aperture 16.

The size or diameter of the integrating spherical body 6 is selected in accordance with the format of the negative or transparency to be printed or enlarged, as more fully shown and described in the above mentioned pending application, Ser. No. 447,326. For example, as therein pointed out an eight inch diameter sphere is required in the case of a 4″ x 5″ negative, an eleven inch diameter sphere for a 5″ x 7″ negative, and corresponding smaller diameter spheres for smaller format negatives, with each size sphere having an exit aperture 17 somewhat larger than the diagonal measurement of the negative in each instance. The light intensity emanating from this sphere exit aperture 17 is naturally dependent upon the lumen output of the collected light passing through the collector and filter unit exit aperture 16 and into the spherical body 6 but to an even greater extent such intensity is dependent upon the diameter of the reflecting and integrating sphere 6 itself.

This is because theoretically the intensity of the light leaving the sphere exit window or aperture 17 increases inversely proportional to the square of the sphere diameter. The invention disclosed in the above noted pending application, Ser. No. 447,326, fully recognized this theory but because the variable connection of the different diameter spheres directly to the filter units was difficult due to the movement therebetween, light losses occurred at the junctures so that actual gain in light intensity did not sufficiently follow the above noted square law when sphere diameters were changed for certain size negatives.

These above-noted defects have been eliminated in the structure of the present invention by the provision of an integrating spherical body structure wherein the overall length thereof remains uniform regardless of sphere diameter and at the same time a negligible loss of light intensity results, with an ensuing closer adherence to the above mentioned square law. By reference now to FIG. 1 it is to be noted that the distance D between the exit apertures 16 of the filter units 5 remains constant regardless of the diameter of the spherical body 6. This is accomplished by the provision of the previously mentioned conical light guides 7 which are an integral part of each integrating spherical body 6 regardless of the diameter of the latter.

Each integrating spherical body 6 is characterized by the radius $r$ which can measure from three to fifteen inches according to negative sizes and thus covering transparencies from eight by ten inches down to 35 mm. and smaller. Since the distance D is to remain constant with all size spheres, the diameter of each sphere is supplemented for the distances Z by the conical light guides 7. This gives rise to the geometrical condition that all spheres and light guides can be expressed mathematically as:

$$2(r+Z)=D$$

which in terms determines the necessary length per conical light guide that is affixed to each specific size sphere. When so affixed such conical light guides 7 direct the flux of light emanating through the exit aperture 16 from the light collector and filter units 5 into the spherical body 6 with negligible loss of light.

These conical light guides 7 are cast of either white glass, a light transparent acrylic, or similar material, wherein the light losses therein are very small, since the length of such light guides are relatively short resulting in light losses of not more than about 7% to 8% which is no greater than the normal reflection losses at their entrance and exit windows, and the design thereof is also such as not to introduce spurious light losses therein.

Since these conical light guides 7 are thus a permanent part of each particular size spherical body they must necessarily be designed to certain dimensions, so as to assure passage of the total light flux emanating from the aperture 16 through these guides 7 into the integrating sphere 6 with a minimum loss thereof. The light entrance aperture 18 of the sphere 6 and the corresponding diameter exit end $f$ of the conical light guide 7 are made as small as possible to reduce light losses within the sphere as otherwise some of the light scattered by the wall of the sphere 6 could escape backward through such apertures and hence be totally lost from use in printing a negative. Conversely, the exit aperture 16 of the filter chamber 10, and which corresponds in diameter to the entrance end F of the conical light guide 7, must be large enough to pass the full cross-section of the light beam produced by the lamp 8 and light collector 9 and projected outwardly through the exit aperture 16. Also, it is essential that the total light flux be conducted through the conical light guides 7 almost entirely by internal reflection, with no light passing through the walls of the guide 7 which would otherwise diminish the light collecting property thereof.

By reference now to FIG. 2, there is schematically shown therein an entering light beam L, and constituting the light beam emanating from the exit aperture 16 of the collector and filter unit 5, which light beam L is inclined by the angle $a$ relative to the perpendicular face of the entrance end F of the conical light guide 7. Due to refraction at this latter surface such angle diminishes to angle $b$ according to the law of refraction whereby $\sin a/\sin b = K$, thus giving the coefficient of refraction of the material of the light guide 7 which preferably is approximately 1.5. The beam L then continues in the light guide 7 and strikes the mantle of the cone at 27 under the angle $c$ and is reflected back into the light guide 7 at this same angle $c$. Thereupon such light beam L contacts the exit end $f$ at an angle $d$ whereby $\sin g/\sin d = K$. The angle of reflection $c$ at point 27 has to be such that the beam L is totally reflected into the light guide 7 and does not leave the latter through the side wall as appreciable loss of light flux would otherwise ensue. Under optical law this is assured so long as the angle $c$ is not greater than about 42°.

Inasmuch as the wall of the conical light guide 7 is inclined by an angle $e$ and the number of reflections could be more than one, the angle $c$ increases with each reflection following contact of the light beam L with the mantle of the conical light guide 7 until the beam L leaves such guide at its exit end $f$. This accordingly places restrictions on the angle $e$ of the conical light guide 7 which has been found to be unsatisfactory when such angle exceeds about 6°. Based on the foregoing, and with the diameter of the entrance end $f$ of the conical light guide 7 being constant for all size of spherical bodies 6, the exit end $f$ of such conical light guide 7 can be computed to:

$$f=F-(D-2r)\tan e$$

which formula establishes that for small size spherical bodies 6, the exit end $f$ of the conical light guide 7 is at its smallest diameter, and thus commensurate with reduction in light losses, by maintaining back reflection from the sphere to an absolute minimum, especially since such light losses by back scattered light are normally more pronounced in small spherical bodies.

By providing the various size spherical bodies with appropriately sized conical light guides in accordance with the present invention, only one overall length is required regardless of the sphere size. Moreover, by the utilization of a proper size sphere and light guides commensurate therewith, as hereinabove pointed out, it has been found that the light output from an 8 inch diameter spherical body utilized with 4″ x 5″ negatives was increased by 1.7 times. Likewise the light output from a 5.6 inch sphere used with 2¼″ x 2¾″ negatives increased by over 3.3 times and that of a 3¼ inch sphere used with 35 mm. and smaller size negatives increased in light output by a factor of 6 times.

It should thus be obvious to those skilled in the art from the foregoing that a high speed color enlarger having integrating spherical bodies with integral conical light guides has been provided by the present invention. Although the spherical bodies vary in diameter depending upon the size of the photographic transparency to be printed or enlarged, the overall length of such bodies together with their integral conical light guides remains uniform for all units, thus rendering them readily insertable into the rest of the enlarger apparatus for the making of any desired size print or enlargement. Also by the provision of a preselected size of conical light guide with the appropriate diameter of spherical body, the light output is substantially increased thus resulting in a material reduction in the time required to produce a desired photographic print or enlargement.

Although one specific embodiment of the present invention has been herein shown and described, it is to be understood that still further embodiments thereof may be made without departing from the spirit and scope of the appended claims.

I claim:
1. A high speed color-printing enlarger for illuminating a film transparency during the making of a print or enlargement thereof comprising:
   (a) a pair of oppositely disposed combination light collector and filter units fixedly spaced from each other for projecting a concentrated light beam outwardly from said unit through an exit aperture,
   (b) an integrating spherical body of preselected diameter provided with an exit window for the egress of uniform intensity light over the surface of a juxtapositioned film transparency, and
   (c) a pair of diametrically disposed conical light guides secured to said integrating spherical body to form a unitary member, and each said conical light guide having a cone angulation and an overall length which varies inversely to the diameter of said spherical body to which they are attached, to enable said unitary member to be readily positioned in light-tight manner between said oppositely disposed fixedly spaced combination light collector and filter units.

2. A high speed color-printing enlarger for illuminating a film transparency during the making of a print or enlargement thereof as set forth in claim 1 wherein:
   said conical light guides each have a light entrance end of substantially the same diameter as the converging light beam emanating from said light collector and filter unit at the juncture thereof with said conical light guide, for the passage of light flux therebetween without substantially any loss thereof.

3. A high speed color-printing enlarger for illuminating a film transparency during the making of a print or enlargement thereof as set forth in claim 1 wherein:
   said conical light guides have a length varying inversely to the diameter of said spherical body, to provide a uniform overall length of said unitary member with each different diameter spherical body as required for different size film transparencies.

4. A high speed color-printing enlarger for illuminating a film transparency during the making of a print or enlargement thereof as set forth in claim 2 wherein:
   said conical light guides have a small exit end for transmitting the light flux with minimum loss into the interior of said integrating spherical body and wherein the diameter of such small exit end decreases in size in a predetermined relationship to the decrease in diameter of said spherical body as required for different size film transparencies.

5. A high speed color-printing enlarger for illuminating a film transparency during the making of a print or enlargement thereof as set forth in claim 1 wherein:
   said conical light guides have an exit end at their juncture with said spherical body of a diameter computed to be $$f = F - (D - 2r) \tan e$$

in which $f$ is the exit end diameter, $F$ the diameter of the light entrance end thereof, $D$ the distance between the oppositely disposed combination light collector and filter units to which the entrance end of said light guides attach, $r$ is the radius of the spherical body, and $\tan e$ is the tangent of the cone angle.

6. A high speed color-printing enlarger for illuminating a film transparency during the making of a print or enlargement thereof as set forth in claim 1 wherein:
   said conical light guides have an included cone angle not greater than approximately 12°.

References Cited
UNITED STATES PATENTS

| | | | |
|---|---|---|---|
| 3,077,140 | 2/1963 | Simmon et al. | 355—35 |
| 3,316,804 | 5/1967 | Weisglass | 355—67 |

NORTON ANSHER, Primary Examiner

R. A. WINTERCORN, Assistant Examiner

U.S. Cl. X.R.

240—41.35; 355—67, 70